INVENTOR
JORGEN P. VINDING
BY Harvey G. Lowhurst
ATTORNEY

INVENTOR

BY Harvey J. Lambert

ATTORNEY

INVENTOR
JORGEN P. VINDING
BY Harvey J. Lambert
ATTORNEY

INTERROGATOR-RESPONDER IDENTIFICATION SYSTEM

Filed May 7, 1965 4 Sheets-Sheet 4

INVENTOR
JORGEN P. VINDING
BY Harvey G. Lambert
ATTORNEY 3,299,424

INTERROGATOR-RESPONDER IDENTIFICATION SYSTEM

Jorgen P. Vinding, 18780 Withey Road, Monte Sereno, Calif. 95030

Filed May 7, 1965, Ser. No. 453,939
21 Claims. (Cl. 343—6.5)

This invention relates to an identification system for recognizing an object as a member of a class or as a particular member within that class, or both. More particularly, this invention relates to an interrogator-responder identification system in which an interrogator interrogates the object to be recognized when in inductive coupling proximity thereto and in which the responder responds to such interrogation in a manner by which the interrogator can recognize the object either as a member of a class or as a particular member within that class.

Interrogator-responder identification systems known heretofore are characterized in that the interrogation and the response are in the form of radio signals, i.e., they communicate by transmitting and receiving high frequency energy. In such systems the interrogator is provided with an antenna element for radiating the interrogator signal and for receiving the responder signal, and the responder is similarly provided with an antenna element for receiving the interrogator signal and for transmitting the responder signal. The interrogator and responder signals are generally sinusoidally amplitude modulated carrier signals.

The method utilized for the recognition of the object to be identified, in prior art interrogator-responder systems, is the modulating of a carrier signal, either from the interrogator or the responder or both, with selected audio (lower) frequency signals, or their suppression from one or the other carrier signal. An example of such a prior art system is disclosed in United States Letters Patent No. 3,054,100, issued to C. S. Jones on Sept. 11, 1962.

While such prior art interrogator-responder identification systems for the identification of objects are eminently suitable where cost is not a factor and where the generation of radio signals is of no consequence, there are many applications where these and other factors make them unsuitable. For example, there is a great need for a simple, inexpensive and non-radiative identification system which will automatically identify employees entering a factory, an office or some other premise. For such applications, the identification of persons entering such premises may be by the class which is "authorized" to enter, or may be by identification of particular persons entering to create an individual attendance record for payroll purposes in case of employees, or for billing purposes in case of patrons or the like.

Another application where an inexpensive and reliable identification system is desired is in connection with automobiles either entering a selected area or passing a selected point. For example, a selected area may be set aside for the parking of selected vehicles in which case the vehicles entering should be recognized by class. In another application, the vehicles passing a toll gate should be identified individually for automatic accounting and billing to the vehicle owner.

Another application for an economical object identification system is the identification of a class of books in a library which are recognized when passing through a designated exit to prevent their theft. Or in the alternative, individual books may be separately identified for automatic check-out and check-in purposes.

Another limitation of the prior art identification system, quite aside from their high cost, is the consideration that they are radiators of radio signals which may interfere with the operation of other devices, such as communication or control equipment. For example, it is well known that many communications and instruments are affected by "spurious" radio signals in their vicinity. Furthermore, the generation of radio-frequency waves is often subject to government restrictions and control which might make an optimum carrier frequency signal unavailable to the user of the identification system, particularly since many portions of the radio-frequency spectrum are already severely overcrowded.

Finally, one further limitation of the above-mentioned radio-frequency identification system is the requirement that both the interrogator and the responder include a radiative element for efficiently radiating at the carrier frequency. This requirement is usually met by making the equivalent physical length of the antenna element equal to one or more one-quarter wavelengths of the mean carrier wavelength. Accordingly, for an efficient radiator element for a VHF carrier frequency of 250 megacycles per second, the equivalent physical size of the element must be about 1 foot. These considerations require the use of very high frequencies, which are often not commensurate with other requirements.

It is, therefore, a primary object of this invention to provide a new and novel object identification system.

It is a further object of this invention to provide an interrogator-responder identification system which is reliable in operation, economical in construction and small in physical size.

It is a further object of this invention to provide a nonradiative portable and inexpensive responder which may be used with a stationary interrogator.

It is another object of this invention to provide an interrogator-responder identification system in which the responder is identified when inductively coupled to the interrogator.

It is still a further object of this invention to provide an interrogator-responder identification system which is essentially nonradiative and in which the responder generates the identification code which is recognized by the interrogator.

It is still another object of this invention to provide an interrogator-responder identification system in which the responder is pulse coded for greatest assurance, sensitivity and accuracy.

It is a still further object of this invention to provide an interrogator-responder identification system in which the interrogator and the responder both include circuits tuned to the same frequency, and in which identification takes place when the tuned circuits are in coupling proximity, and in which the recognition takes place by repetitively detuning or loading the tuned circuit of the responder for periods, and with repetition rates, which are characteristic of that particular responder.

Briefly, in the present invention the interrogator has a tuned circuit tuned to the output frequency of a generator to which it is coupled. The responder also includes a circuit which is tuned to the frequency of the generator in the interrogator. Accordingly, when these two tuned circuits are brought into inductive coupling proximity, a signal will be induced into the responder tuned circuit and the same will resonate at the generator frequency. When inductively coupled, the tuned interrogator and responder circuits behave like the primary and secondary of a transformer, the secondary loading the primary.

The responder tuned circuit is coupled, through a switch means, to a detuning or loading circuit. The switch means is actuated for selected intervals and with selected repetition rates to detune or load the responder tuned circuit. Each time the responder tuned circuit is detuned or loaded, its effect on the interrogator tuned circuit is decreased and the amplitude of the signal in the interrogator tuned circuit is increased. The frequency and length of the amplitude variations in the interrogator tuned circuit are utilized to recognize the responder.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

Figure 1:
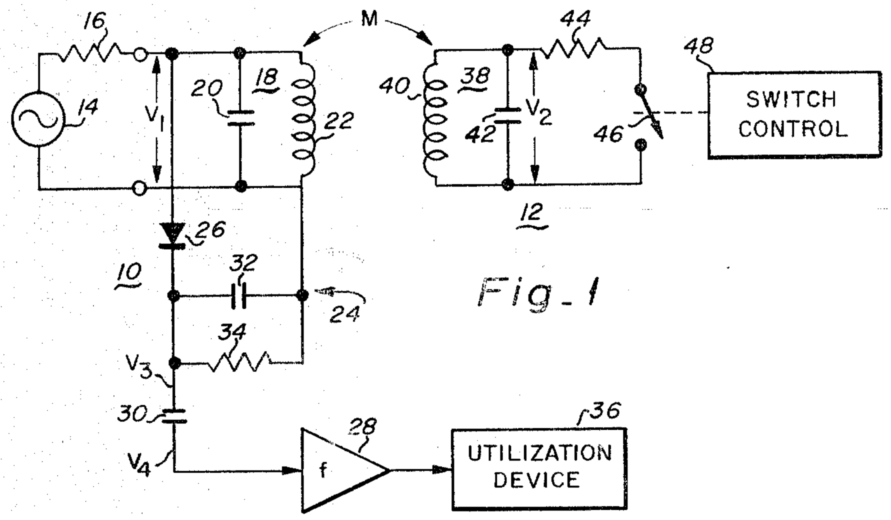
FIGURE 1 is a schematic circuit diagram of an interrogator and a responder, constructed in accordance with this invention, utilizing a single code frequency.

Referring now to the drawings, and particularly to FIGURE 1 thereof, there is shown an interrogator means 10 and a responder means 12 located in sufficiently close proximity for inductive coupling as indicated by the letter "M."

Interrogator 10 includes a frequency generator means 14 for generating a sinusoidal signal of an interrogator frequency F, a load impedance 16, and a tuned circuit 18 connected across generator 14 and impedance 16. Circuit 18 comprises a capacitive impedance 20 and an inductive impedance 22 having their impedances selected to tune circuit 18 to the generator frequency F.

Coupled across tuned circuit 18 is a utilization or response signal sensing circuit 24 which includes a detector means, such as diode 26, and a tuned amplifier 28 which is tuned to a responder frequency *f* which is much smaller than F. Detector means 26 is capacitively coupled to tuned amplifier 28 through a coupling capacitor 30. Capacitor 32 and resistor 34 respectively form the alternating current (A.C.) and the direct current (D.C.) paths across tuned circuit 18. The output signal from tuned amplifier 28 is applied to a utilization device 36 which may take the form of a bell, counter, register, or any other device capable of indicating the presence of an output signal from amplifier 28.

Responder 12 includes a tuned circuit 38 having an inductive impedance 40 and a capacitive impedance 42 whose impedance values are selected for resonance at the interrogator frequency F. Connected across tuned circuit 38 is a detuning or loading means 44 in series with a switch means 46. Switch means 46 includes a switch control means 48 which controls the position of switch means 46 in accordance with a preselected program. By way of example, control means 48 may be constructed to open and close switch means 46 with a frequency *f*, the responder code frequency. As will become better understood hereinafter, the combination of switch means 46 and control means 48, utilized in practicing the present invention, is in the nature of an electronic gating circuit which alternately connects and disconnects detuning or loading means 44 across tuned circuit 38 with a frequency *f*.

In operation, interrogator tuned circuit 18 is excited by generator 14 to resonance at the frequency F. In the preferred embodiment of this invention, the physical size of circuit 18 is much less than one-quarter wavelength of the operating frequency F so that substantially no wave energy is radiated. Interrogator 10 is generally stationary and is placed at a selected location such as, for example, near an entrance.

Responder 12 is generally carried by the object to be identified and has a tuned circuit, likewise dimensioned to be practically nonradiating. When responder 12 comes within close proximity to interrogator 10, tuned circuits 18 and 38 inductively intercouple in a manner well known to those skilled in the art. The process of coupling herein referred is mutual coupling by which the flux generated in inductor 22 links with inductor 40 and induces a voltage therein. When so coupled, tuned circuit 38 loads tuned circuit 18. Detuning means 44 (the term detuning as used herein denotes not only frequency detuning but also loading) may either be a low resistive impedance or a reactive impedance or a combination of a resistive and a reactive impedance. Generally speaking, detuning means 44 is selected so that when switch 46 is closed, it either loads and/or detunes circuit 38.

As is well known to those skilled in the art, a substantially non-dissipative, tuned secondary circuit reflects a maximum load on the primary circuit to which it is coupled and the amplitude of the signal in the primary circuit will be a minimum. If the secondary circuit is made either very lossy or is detuned, its loading effect on the primary circuit is very substantially decreased. Accordingly, upon closure of switch 46, circuit 38 either becomes detuned or very lossy thereby decreasing its loading effect upon tuned circuit 18.

Figure 2:
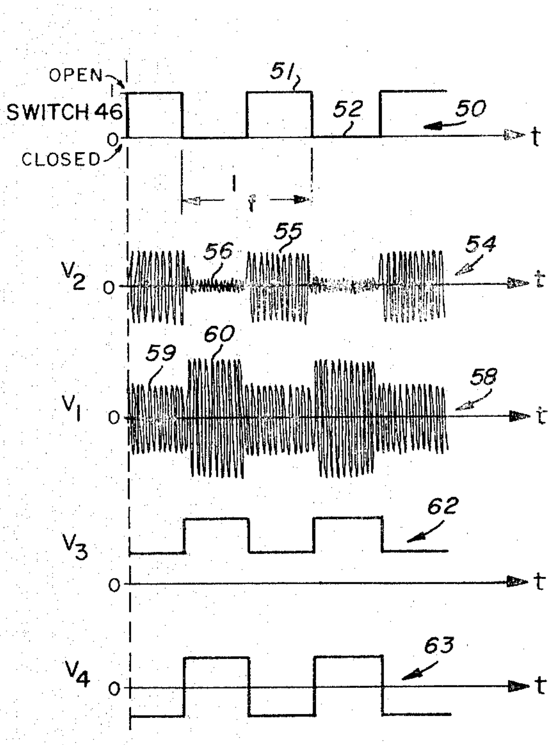
FIGURE 2 are a number of voltage-time diagrams illustrating the voltage variations at various points in the interrogator and responder shown in FIGURE 1.

Referring now to FIGURE 2, there are shown a number of curves illustrating the operation of this invention. Curve 50 is a position versus time graph which illustrates successive positions of switch 46, and shows switch 46 in its open position at 51 and in its closed position at 52. If switch 46 is opened and closed with a frequency *f*, then the time between such successive openings would be $1/f$ seconds as shown on the time scale of graph 50. Graph 54 is a voltage versus time graph showing the amplitude of the voltage induced into tuned circuit 38. This voltage is a maximum, as shown at 55, when switch 46 is open reflecting a low-loss tuned circuit and is a minimum as shown at 56 when switch 46 is closed reflecting a high-loss or detuned circuit.

Graph 58 is a voltage versus time curve of the voltage across tuned circuit 18 and indicates that the signal amplitude is a minimum, as shown at 59, when switch 46 is opened and a maximum, as shown at 60, when switch 46 is closed. Graph 62 is a voltage versus time curve showing the detected voltage at the output terminal of detector 26. This curve, of course, is the envelope of graph 58 and follows the responder frequency *f*. Graph 63 is the voltage versus time curve of the voltage applied to tuned amplifier 28 and is identical to graph 62, except that the D.C. component has been removed by coupling capacitor 30. The signal represented by graph 63, and to which amplifier 28 is tuned, is suitably amplified and applied to utilization means 36 to give an alarm or to operate a control circuit depending on how the interrogator-responder identification system of this invention is utilized.

While amplifier 28 is preferably tuned to the responder switch means frequency $f$ for maximum selectivity and discrimination against noise, it is to be understood that the invention will also operate satisfactorily with an untuned amplifier. The frequency ranges for $f$ and F may be selected from a wide range and are not critical. For example, frequency F may be selected from 10 kilocycles to above 10 megacycles. At very much higher frequencies, the physical dimension of either tuned circuit may become inconveniently small if radiation is to be avoided. The responder switching frequency is selected to be much less than the interrogator frequency and is typically chosen from 2 to 50 kilocycles per second.

Figure 3:
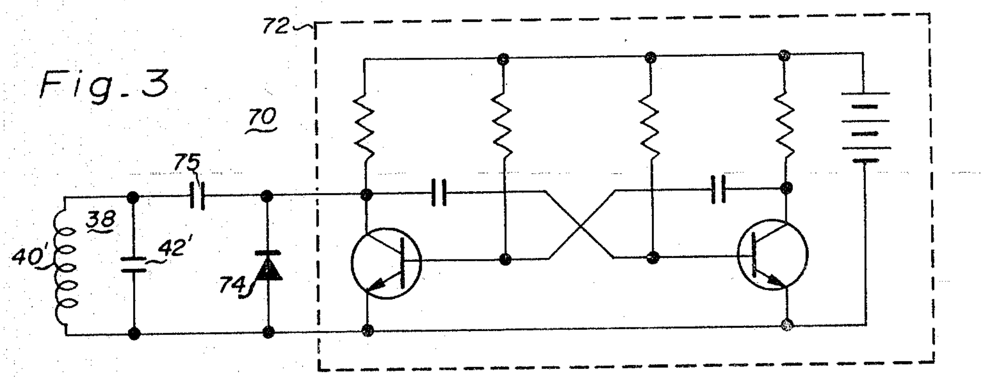
FIGURE 3 is a schematic circuit diagram of an alternate embodiment of the responder of FIGURE 1.
Figure 4:
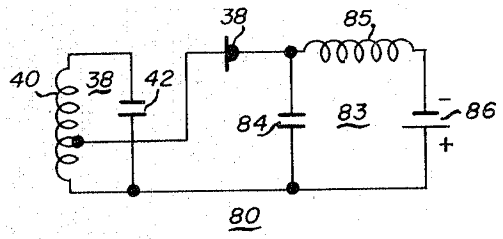
FIGURE 4 is a schematic circuit diagram of another embodiment of the responder of FIGURE 1.
Figure 5:
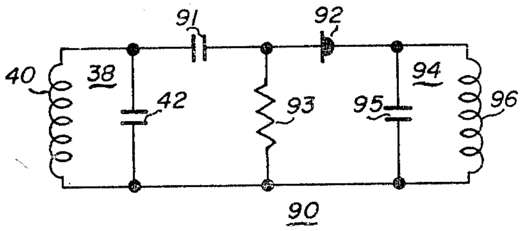
FIGURE 5 is a schematic circuit diagram of still another embodiment of the responder of FIGURE 1.

Referring now to FIGURES 3, 4 and 5, there are shown three different embodiments of electronically switched responders which may be utilized with interrogator 10 of FIGURE 1. For the sake of simplicity, the tuned circuit portion of the several responders there shown are designated with the same reference characters as used in FIGURE 1 since they may be identical.

Referring now specifically to FIGURE 3, the responder 70 there shown comprises a circuit 38 tuned to interrogator frequency F and a conventional free running multivibrator 72 which includes its own power supply. The time constant circuits of multivibrator 72 are selected to provide a square wave output of responder frequency $f$, the frequency which corresponds to the switching rate of switch 46 of FIGURE 1. The output signal of multivibrator 72 is applied to a varactor 74 to change its capacitive impedance, in a manner well known in the art, between a first and a second value. Varactor 74 is coupled, through a coupling capacitor 75, across tuned circuit 38. Varactor 74 may take the form of a reverse biased silicon diode whose capacitance is known to vary with the amplitude of the reverse bias.

Initially, the capacitance of tuned circuit capacitor 42' is selected so that, in combination with the capacitance of capacitor 75 and varactor 74 for one state of multivibrator 72, circuit 38 is tuned to the interrogator frequency F. When the output signal from multivibrator 72 changes to its other state, it changes the capacitance of varactor 74 and thereby detunes circuit 38 sufficiently to decrease its load upon the tuned interrogator circuit. In this manner, an electronic switching means is provided which detunes circuit 38 at the responder frequency $f$.

FIGURE 4 shows a responder 80 in which tuned circuit 38 is coupled to a relaxation oscillator comprising the combination of a tunnel diode 82 and a further tuned circuit 83 made up of a capacitor 84, an inductor 85 and a source of direct current power 86. Circuit 83 is tuned to the desired responder frequency $f$. In operation, the oscillations in tuned circuit 83 will switch tunnel diode 82 between its high and its low impedance state with a frequency corresponding to the resonance frequency of circuit 83 and thereby introduces a varying impedance into tuned circuit 38 with a frequency $f$ thereby making the same alternately lossy and loss-less.

FIGURE 5 shows a responder 90 which is similar in most respects to responder 80 of FIGURE 4 except that responder 90 is self-powered. As there shown, tuned circuit 38 is coupled, through a suitable coupling capacitor 91, to a tunnel diode 92 which rectifies a portion of the induced interrogator signal to thereby develop power across a load resistor 93. Tunnel diode 92 rectifies for one-half cycle of the responder frequency $f$ of a tuned circuit 94 which comprises a capacitor 95 and an inductor 96. After the rectification half-cycle, tunnel diode 92 flips to the positive portion of its characteristic to discharge capacitor 95. The combination of tuned circuit 94 and diode 92 forms the relaxation oscillator as before.

Figure 6:
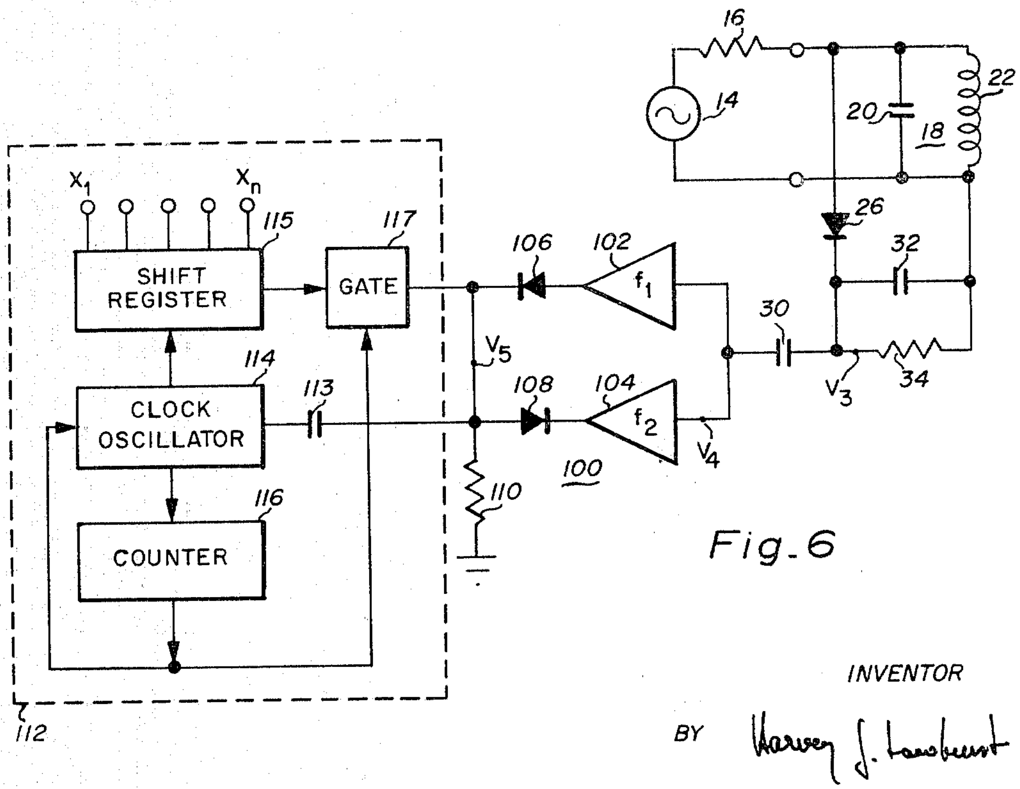
FIGURE 6 is a schematic diagram, partially in block form and partially in circuit form, of an interrogator responsive to two different code frequencies.

Referring now to FIGURE 6, there is shown an interrogator 100 which is similar to the one shown in FIGURE 1 except for the circuitry connected to coupling capacitor

30. To the extent the parts of interrogators 10 and 100 are alike, the same reference characters have been used. Coupling capacitor 30 of interrogator 100, which applies the detected output signal to the interrogator output stage, is coupled to a pair of tuned amplifiers 102 and 104 in parallel which are respectively tuned to a responder frequency $f_1$ and $f_2$. The output signal from tuned amplifier 102 is applied to a first unidirectional current conducting means such as diode 106 poled in one direction and the output signal from tuned amplifier 104 is applied to a second unidirectional current conducting means such as diode 108 poled in the opposite direction from diode 106. The output terminals of both diodes are connected through a common load resistor 110 to some reference point such as ground.

The output signal developed across load resistor 110, in response to the application of responder signals of frequency $f_1$ and $f_2$, is applied to a utilization device 112 for final processing. By way of example, utilization device 112 is shown in the form of a binary register which includes a clock oscillator 114, a coupling capacitor 113 through which the output signal is applied to clock oscillator 114 to start the clock oscillator, a counter 116 coupled to the clock oscillator and a shift register 115 likewise controlled by the clock oscillator. A gate means 117, controlled by counter 116, is used to connect the output signal into shift register 115. Finally, counter 116 is connected to clock oscillator 114 to shut the same off after a preselected count has been reached.

Figure 7:
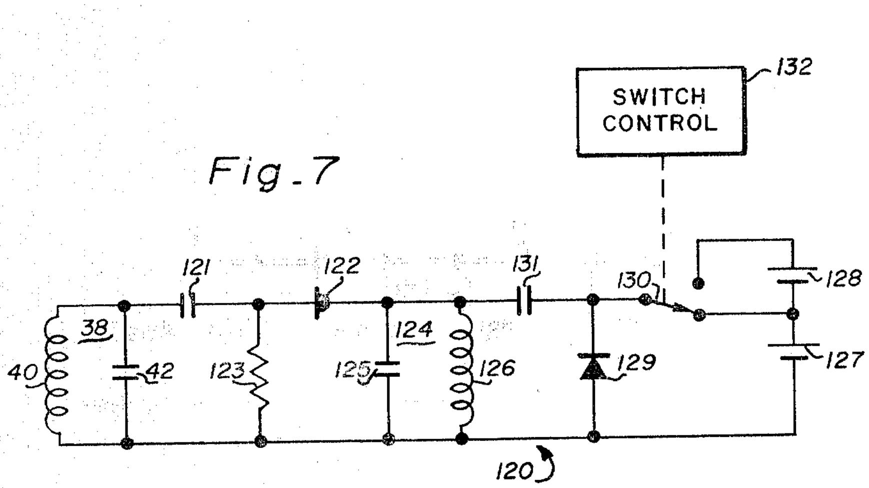
FIGURE 7 is a schematic circuit diagram of a responder, constructed in accordance with this invention, utilizing two different code frequencies.

Referring now to FIGURE 7, there is shown a responder 120 which has certain similarities to responder 90 of FIGURE 5 in that both responders have similar tuned circuits for both the interrogation frequency F and the responder frequency $f$, but differ from one another in that the tuned circuit developing the responder frequency is switchable between responder frequencies $f_1$ and $f_2$.

More particularly, responder 120 includes a tuned circuit 38, tuned to the frequency of the interrogator signal F, having an inductor 40 and a capacitor 42. Tuned circuit 38 is connected, through a coupling capacitor 121 and a shunt resistor 123, to a tunnel diode 122. Tunnel diode 122 is connected to a tuned circuit 124 which includes a capacitor 125 and an inductor 126. The combination of tunnel diode 122 and tuned circuit 124 forms a relaxation oscillator as was explained in connection with FIGURE 5.

A pair of power supplies 127 and 128 are connected in series aiding across a varactor 129 through a switch means 130 which applies, depending on its position, the voltage from either supply 127 or from both supplies, to the varactor. A switch control means 132 is provided to control switch means 130. Varactor 129 is coupled across tuned circuit 124 through a coupling capacitor 131, and thereby becomes a portion of the capacitance of tuned circuit 124.

In operation, and with switch means 130 in the position shown, the capacitive impedance of element 125 is selected so that circuit 124 is tuned to the responder signal frequency $f_1$ (taking into consideration the impedance of element 129, in the presence of source 127, and 131). When switch means 130 is moved to its other position, thereby increasing the back-bias on varactor 124, its capacitance decreases, thereby tuning circuit 124 to a frequency $f_2$ different from $f_1$. The frequency $f_2$ can be selected by voltage of supply 128. Since the frequency of the relaxation oscillator depends on the frequency to which circuit 124 is tuned, it is immediately apparent that a change in the position of switch means 130 changes the detuning rate of tuned circuit 38 and thereby the responder frequency. In this manner, therefore, a responder is provided which may be operated at more than one responder frequency. By adding additional power supplies (or changing the back-bias on varactor 129) additional responder frequencies may be developed.

The responder of FIGURE 7 may be utilized to change the loading frequency on the intercoupled interrogator between two or more different frequencies, such as $f_1$ and $f_2$, in accordance with the program provided by a switch control means 132. Used in this manner, the output circuitry of the responder may be made sensitive not only to the frequency $f_1$ and $f_2$, but also to the time of occurrence of each of these two frequencies. For example, the program of changing between the two frequencies may be a binary code which identifies a particular responder by a digital number.

Used in this manner and in conjunction with interrogator 100 of FIGURE 6, amplifier 102 or 104 provides an output signal depending on whether switch means 130 is in one or the other of its two positions. If switch control means 132 has a number of successive positions equal to "*n*," corresponding to the number of stages in shift register 115, and a switching rate corresponding to the frequency of clock oscillator 114, shift register 115 may be utilized for the binary decoding of the switch positions corresponding to the occurrence of responder frequencies $f_1$ and $f_2$ as provided by switch control means 132.

Figure 8:
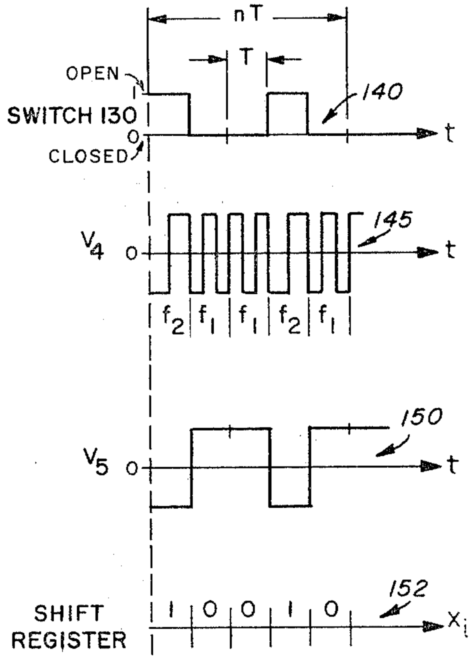
FIGURE 8 are a number of voltage-time diagrams illustrating the voltage variations at various points in the interrogator and responder respectively shown in FIGURES 6 and 7.

Referring now to FIGURE 8, there are shown some illustrative diagrams useful in explaining the operation of interrogator 100 of FIGURE 6 when responder 120 of FIGURE 7 is inductively coupled thereto. Assume that switch control means 132 repeats its program after the occurrence of five clock time periods T and that shift register 115 has five corresponding stages. Assume further that the digital code to be generated is 1–0–0–1–0 and that a digit 1 is entered when responder 120 provides a responder frequency $f_2$. Assume further that responder 120 generates a response frequency $f_2$ when in the "up" position. Accordingly, switch means 130 is actuated in such a manner that it is in the "up" position during the first clock pulse, in the down position during the second and third clock pulses, in the up position during the fourth clock pulse and in the down position during the fifth clock pulse.

Graph 140 of FIGURE 8 illustrates the successive switch positions for this program. Under these assumed conditions, the voltage at the output of coupling capacitor 30 of FIGURE 6, as shown by graph 145, reflects the detection of a responder frequency $f_2$ during the first and fourth clock pulse periods and a responder frequency $f_1$ during the second, third and fifth clock pulse periods. After this signal is processed by the tuned amplifiers 102 and 104 and diodes 106 and 108, the signal appearing across resistor 110 is as shown in graph 150 of FIGURE 8. Graph 152 illustrates the condition of register 115 after the same is set by a completed program.

Figure 9:
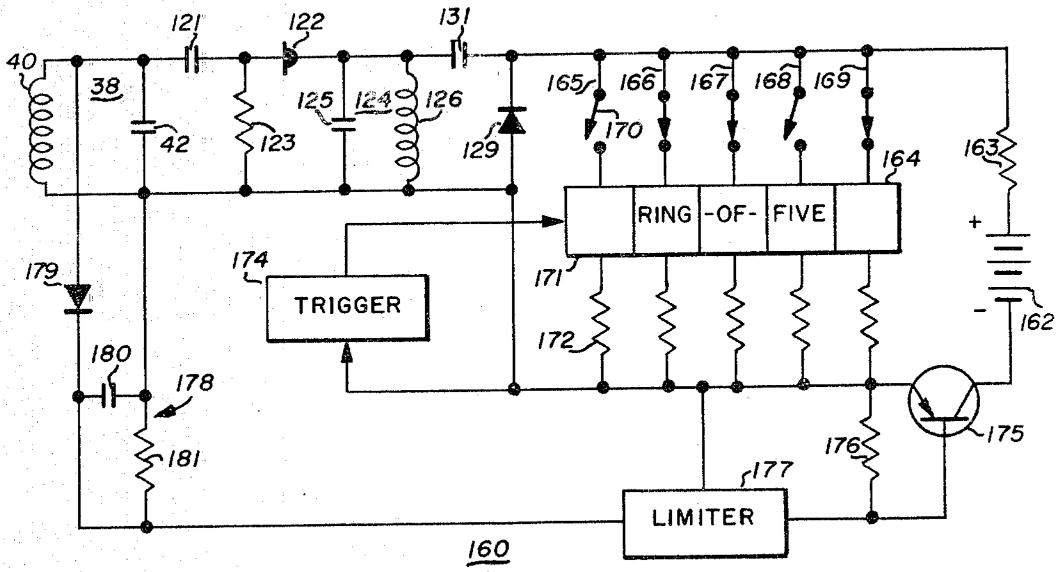
FIGURE 9 is a schematic diagram, partially in block form and partially in circuit form, of a programmed double code frequency responder useful for cooperation with an interrogator such as shown in FIGURE 6.

Referring now to FIGURE 9, there is shown a responder 160 including a circuit 38 tuned to the interrogator frequency F, and a relaxation oscillator having a tuned circuit 124, a tunnel diode 122 and a variable impedance in the form of a varactor 129. Since this portion of responder 160 is substantially identical to the corresponding portion of responder 120 of FIGURE 7, the same reference characters have been used to designate like parts. Responder 160 differs from responder 120 of FIGURE 7 in that it includes a self-powering feature in the form of a power developing control circuit 178 and an electronic switch and switch control means in the form of a ring-of-five 164 for changing the responder frequency between a response frequency $f_1$ and $f_2$.

More particularly, varactor 129 has connected accross it a voltage source 162 in series with a load resistor 163. Connected in this manner, and neglecting for the moment the ring-of-five 164, circuit 124 is tuned to the frequency $f_1$. In parallel with varactor 129 are five branch arms 165, 166, 167, 168 and 169, each of which includes a mechanical switch 170 which may either be open or closed and which in initially set to the desired binary code. The five branch arms are connected into the circuit by means of ring-of-five 164 and load resistors 172. Each stage of ring-of-five 164 is used as a gate which is normally closed and which is opened in sequence upon the application of a trigger. Atrigger source 174 is utilized to provide the trigger to advance the ring.

There is further provided an electronic switch which may be a transistor 175 as shown, and which is serially connected into the battery circuit. A base biasing resistor 176 is connected between the emitter and the base of transistor 175 so that, unless a voltage is applied to the base, switch 175 remains open to disconnect battery 162. The transistor base circuit is connected, through a conventional voltage limiter 177, to power developing control circuit 178. Power developing control circuit 178 is formed by connecting a rectifier 179 across tuned circuit 38 so that power is developed and control is provided only when a signal is induced into tuned circuit 38. There is also provided an alternating current and a direct current return path in the form of capacitor 180 and resistor 181.

Limiter 177 may take the form of a Zener diode, and its purpose is to maintain a constant control voltage at the base of transistor 176 so that the switching action of transistor 175 will be independent of the degree of coupling between the interrogator and responder, when a minimum value or threshold is exceeded.

In operation, responder 160 is set to its desired code by means of switches 170. The code illustrated in FIGURE 9 is 1–0–0–1–0. As a voltage is induced in tuned circuit 38, a portion thereof is rectified by element 179, and applied, via limiter 177, to the base of transistor 175 to connect power supply 162 into the circuit. As trigger 174, which may be powered by supply 162, as shown, starts to operate and advance ring 164, the individual branch arms 165–169 are sequentially connected across varactor 129. Whenever a switch 170 is open, the branch arm has no effect on the voltage across varactor 124 and when a switch 170 is closed, the branch arm will have the effect of lowering the voltage across varactor 129 and thereby change the response frequency to its second value.

While the interrogators shown in FIGURES 1 and 6 detect the presence of an inductively coupled responder by sensing the amplitude variations caused by the variable load reflected into tuned circuit 18 at the responder frequency $f$, the interrogator for practicing the instant invention may readily be modified to detect the presence of the inductively coupled responder by sensing the phase variation caused by the reflected load. As is well known to those skilled in the art, a variation of the load reflected into a tuned circuit not only causes a variation of the oscillation amplitude but also of the phase of the oscillations with respect to the driving signal.

Figure 10:
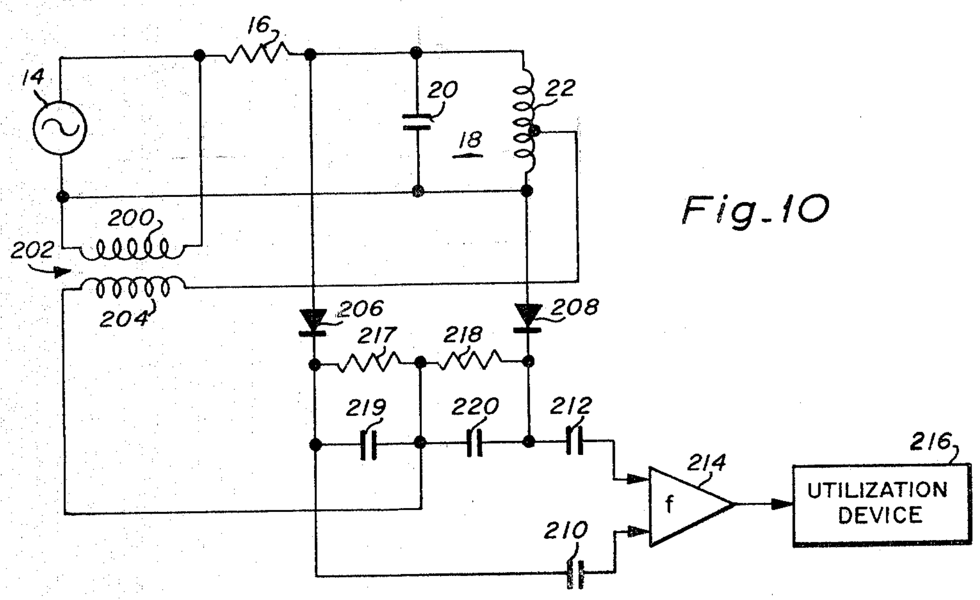
FIGURE 10 is a schematic diagram, partially in block form and partially in circuit form, of an interrogator utilizing the change in phase caused by the proximity of the responder.

Referring now to FIGURE 10, there is shown an interrogator which senses phase variations between the signal source driving the tuned circuit and the signal in the tuned circuit. Utilizing the same reference characters to designate like parts, the interrogator includes a signal source 14, providing an output signal at the frequency F, which is connected through a load resistor 16 to circuit 18 tuned to the frequency F. Tuned circuit 18 includes a capacitive impedance 20 and an inductive impedance 22′. Connected directly across signal source 14 is an inductive coil 200 which may form the primary winding of a transformer 202 and which has a secondary winding 204. One side of secondary winding 204 is coupled to tank circuit 18 by making a center tap connection to inductive impedance 22′.

A pair of unidirectional current conducting devices, such as diodes 206 and 208, have one of their output terminals connected across tuned circuit 18. The other output terminals of diodes 206 and 208 are connected, through a pair of coupling capacitors 210 and 212, to a differential amplifier 214 tuned to the responder frequency *f*. Output signal from tuned amplifier 214 is applied to a suitable utilization device 216. Diodes 206 and 208 are also connected, through suitable A.C. and D.C. return path resistors and capacitors such as 217, 218, 219 and 220, to the other side of secondary winding 204.

The phase detection circuit portion of FIGURE 10 for detecting phase variations between a source and a tuned circuit driven by the source is conventional. As long as the phase difference between the signal of source 14 and of tuned circuit 18 is constant, the output signal from the phase detection circuit is a constant direct current commensurate with the phase difference which is blocked by coupling capacitors 210 and 212. This indicates a constant loading of tuned circuit 18. When tuned circuit 18 is subjected to variable loading, the phase difference changes and an alternating current component is generated by the phase detecting circuit which is passed by coupling capacitors 210 and 212 and received by amplifier 214. If the phase variations follow the responder frequency *f*, tuned amplifier 214 provides an output signal to actuate utilization means 216 in the same manner as explained above in connection with detecting the amplitude variations.

There has been described hereinabove an interrogator-responder identification system utilizing a pair of tuned circuits which are inductively coupled for identification. The condition of the responder tuned circuit is reflected into the interrogation tuned circuit as a load variation which is sensed by the interrogator output circuitry. The change in condition in the responder is brought about by either loading or detuning, or both, of the responder tuned circuit in periodic fashion and at one or more selected frequencies.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims:

I claim:

1. An identification system for identifying responders when brought within inductive coupling proximity of an interrogator, said identification system comprising:

an interrogator including, a substantially nonradiative coupling circuit tuned to an interrogator frequency, signal source means connected to said tuned coupling circuit to excite said tuned circuit to oscillate at said interrogator frequency, sensing means responsive to said tuned coupling circuit to provide a sensed signal commensurate with a selected characteristic of the oscillations in said tuned coupling circuit, and utilization means responsive to said sensed signal and operative to provide an indication when the selected characteristic of said sensed signal varies in accordance with a preselected program; and at least one responder, each responder including, a substantially nonradiative coupling circuit tuned to said interrogator frequency, impedance circuit means for changing the impedance of the tuned coupling circuit of said responder, and switching means for connecting said impedance circuit means to the tuned coupling circuit of said responder, said switching means being operative to connect and disconnect said impedance circuit means into the tuned coupling circuit of said responder in accordance with said preselected program.

2. An identification system for identifying objects carrying coded responders when the responder carrying object approaches within inductive coupling proximity of an interrogator, said identification system comprising:

an interrogator including, a substantially nonradiative low-loss coupling circuit tuned to an interrogator frequency, signal source means connected to said tuned coupling circuit to excite said tuned coupling circuit to oscillate at said interrogator frequency, amplitude sensing means connected to said tuned coupling circuit to provide an amplitude signal commensurate with the amplitude of the oscillations in said tuned coupling circuit, and utilization means responsive to said amplitude signal and operative to provide an indication when the amplitude of said amplitude signal varies in accordance with a preselected code frequency; and at least one responder, said responder including, a substantially nonradiative coupling circuit tuned to said interrogator frequency, circuit means, and switching means for connecting said circuit means to the tuned coupling circuit of said responder, said switching means being operative to alternately connect and disconnect said circuit means into and out of the tuned coupling circuit of said responder in accordance with said preselected code frequency, said circuit means being operative to alter the load reflected by the tuned circuit of said responder into the tuned coupling circuit of said interrogator when said responder and interrogator are in inductive coupling proximity.

3. An identification system in accordance with claim 2 in which said circuit means includes a resistive impedance for changing the lossyness of the tuned coupling circuit of said responder.

4. An identification system in accordance with claim 2 in which said circuit means includes a reactive impedance for detuning the tuned coupling circuit of said responder.

5. An identification system in accordance with claim 2 in which said circuit means includes a resistive and a reactive impedance for increasing the lossyness and for detuning the tuned coupling circuit of said responder.

6. An identification system for identifying an object by associating a coded responder with such object, the object being recognized when the object associated responder comes within inductive coupling proximity of an interrogator, said identification system comprising:

an interrogator including, a substantially nonradiative low-loss coupling circuit tuned to an interrogator frequency, signal source means connected to said tuned coupling circuit to excite said tuned coupling circuit to oscillate at said interrogator frequency, detector means connected to said tuned coupling circuit to provide a detected signal commensurate with the amplitude variations of the oscillations in said tuned coupling circuit, and frequency sensitive utilization means responsive to said detected signal and operative to provide an indication when said detected signal varies at a preselected code frequency; and a plurality of coded responders, each responder including, a substantially nonradiative coupling circuit tuned to said interrogator frequency, a switching means, and an impedance circuit means connected through said switching means to the tuned coupling circuit of said responder to change the loading characteristic reflected by said last mentioned tuned coupling circuit into the tuned coupling circuit of said interrogator, said switching means being operative to alternately connect and disconnect said impedance circuit means to and from the tuned coupling circuit of said responder at said code frequency.

7. An identification system in accordance with claim 6 in which said impedance circuit means includes a reactive impedance, and in which said switching means comprises a voltage controlled unidirectional current conduction means and a free running multivibrator connected across said current conduction means for alternately backand-forward-biasing said conduction means, said conduction means and said reactive impedance being serially connected across the tuned circuit of said responder.

8. An identification system in accordance with claim 6 in which said impedance circuit includes a tunnel diode means and in which said switching means comprises an oscillator providing an output signal at said code frequency, and in which said oscillator is connected to said tunnel diode means to switch the same between its high and low impedance state at said code frequency.

9. An identification system in accordance with claim 8 in which a resistive impedance is connected across the tuned circuit of said responder to develop the operating power for said oscillator.

10. An identification system for identifying responders when they are brought within inductive coupling proximity of an interrogator, said identification system comprising:

an interrogator including, a substantially nonradiative coupling circuit tuned to an interrogator frequency, signal source means connected to said tuned coupling circuit to excite said tuned coupling circuit to oscillate at said interrogator frequency, amplitude detecting means connected to said tuned coupling circuit to provide a detected signal commensurate with the amplitude envelope of the oscillations in said tuned coupling circuit, and utilization means responsive to said detected signal, said utilization means being tuned to a preselected code frequency which is at least an order of magnitude below said interrogator frequency; and at least one responder, each responder including a substantially nonradiative and tunable coupling circuit having a voltage controllable capacitive impedance, switchable voltage means connected to said capacitive impedance to change the capacity of said capacitive impedance between a first value in which the coupling circuit of said responder is tuned to interrogator frequency and a second value in which said last mentioned coupling circuit is tuned to a frequency different from said interrogator frequency, said switchable voltage means including switching means to change the voltage at a rate corresponding to said preselected code frequency.

11. An identification system in accordance with claim 10 in which said voltage controllable capacitive impedance is a varactor and in which said switchable voltage means is an oscillator means which provides an output signal at said selected code frequency.

12. An identification system in accordance with claim 11 in which said oscillator provides a pulsed output signal.

13. An identification system for identifying coded responders when brought within inductive coupling proximity of an interrogator, said identification system comprising:

an interrogator including a substantially nonradiative coupling circuit tuned to an interrogator frequency, signal source means connected to said tuned coupling circuit to excite said tuned circuit to oscillate at said interrogator frequency, amplitude detecting means connected to said tuned coupling circuit to provide a detected signal commensurate with the amplitude envelope of the oscillations in said tuned coupling circuit, and utilization means responsive to said detected signal, said utilization means including one or more output branches each tuned to a different preselected code frequency; and at least one coded responder, each responder including, a substantially nonradiative coupling circuit having a voltage controllable capacitive impedance, and a switchable voltage means for each output branch of said interrogator and switching its voltage state at a different one of said preselected code frequencies, each said switchable voltage means being connected to control said capacitive impedance and each switchable voltage means having a state in which its output voltage tunes the coupling circuit of said responder to said interrogator frequency.

14. An identification system comprising:

first and second substantially nonradiative tuned coupling circuits relatively movable with respect to one another between a first position in which they inductively intercouple and a second position in which they do not inductively intercouple, said coupling circuits being tuned to a common frequency;

a signal source connected across said first tuned coupling circuit for exciting said first tuned coupling circuit to oscillate at said common frequency;

means incorporated into said second tuned coupling circuit for changing a characteristic of said second tuned coupling circuit whereby the load reflected by said second tuned coupling circuit into said first tuned coupling circuit when inductively intercoupled is changed between a first load and a second load, said means including switching means switchable between a first state and a second state at a code frequency to change the characteristic between said first and said second load;

means for detecting the amplitude of the oscillations in said first tuned circuit and for developing a detected signal; and means responsive to said detected signal and operative to provide a utilization signal when, and only when, said detected signal varies in accordance with said code frequency.

15. An identification system in accordance with chaim 14 in which the means incorporated in said second tuned circuit is a voltage controllable capacitive impedance to alternately tune and detune said second tuned circuit from said common frequency.

16. An identification system in accordance with claim 14 in which the means incorporated in said second tuned circuit is a voltage controllable resistive impedance to alternately load said second tuned circuit.

17. An identification system including an usually stationary interrogator and at least one responder usually carried by a movable object to be identified and in which identification takes place when the responder approaches within inductive coupling proximity of the interrogator, said identification system comprising:

an interrogator including a substantially nonradiative tuned coupling circuit, a signal source coupled to said tuned coupling circuit for exciting the same to resonance, detector means coupled to said tuned circuit to develop a detected signal commensurate with the amplitude of the signal excited within said tuned coupling circuit, and amplifier means tuned to a selected frequency which is at least an order of magnitude lower than the frequency to which said tuned circuit is excited, said amplifier means being responsive to said detected signal and operative to provide a utilization signal when the detected signal varies its amplitude in accordance with said selected frequency; and a responder including a substantially nonradiative coupling circuit adapted to be inductive coupled to the tuned coupling circuit of said interrogator means and circuit means to vary the load it reflects into the tuned coupling circuit of said interrogator, means coupled to said circuit means to alternately vary the load on the tuned coupling circuit of said interrogator between a first and a second load at said selected frequency.

18. An identification system including an usually stationary interrogator and at least one responder, usually carried by a movable object to be identified, and in which identification takes place when the responder approaches within inductive coupling proximity of the interrogator, said identification system comprising:

an interrogator including a substantially nonradiative tuned coupling circuit, a signal source coupled to said tuned coupling circuit for exciting the same to resonance, detector means coupled to said tuned circuit to develop a detected signal commensurate with the amplitude of the signal excited within said tuned coupling circuit, and amplifier means tuned to a selected frequency which is at least an order of magnitude lower than the frequency to which said tuned circuit is excited, said amplifier means being responsive to said detected signal and operative to provide a utilization signal when the detected signal varies its amplitude in accordance with said selected frequency;

a responder including a substantially nonradiative tunable coupling circuit adapted to be inductively coupled to the tuned coupling circuit of said interrogator, said tunable coupling circuit including means to alternately tune and detune the tunable coupling circuit of said responder at said selected frequency to and from the frequency of the tuned coupling circuit of said interrogator; and utilization means responsive to said utilization signal to provide an indication of the presence of a utilization signal.

19. An identification system including an usually stationary interrogator and at least one responder, usually carried by a movable object to be identified, and in which identification takes place when the responder approaches within inductive coupling proximity of the interrogator, said identification system comprising:

an interrogator including a substantially nonradiative tuned coupling circuit, a signal source coupled to said tuned coupling circuit for exciting the same to resonance, detector means coupled to said tuned circuit to develop a detected signal commensurate with the amplitude of the signal excited within said tuned coupling circuit, and amplifier means tuned to a selected frequency which is at least an order of magnitude lower than the frequency to which said tuned circuit is excited, said amplifier means being responsive to said detected signal and operative to provide a utilization signal when the detected signal varies its amplitude in accordance with said selected frequency;

a responder including a substantially nonradiative loadable coupling circuit adapted to be inductively coupled to the tuned coupling circuit of said interrogator, said loadable coupling circuit including means to alternately load and unload said tunable coupling circuit at said selected frequency; and utilization means responsive to said utilization signal to provide an indication of the presence of a utilization signal.

20. An identification system for identifying responders when brought within inductive coupling proximity of an interrogator, said identification system comprising:

an interrogator including, a substantially nonradiative coupling circuit tuned to an interrogator frequency, signal source means connected to said tuned coupling circuit to excite said tuned circuit to oscillate at said interrogator frequency, amplitude sensing means connected across said tuned coupling circuit to provide an amplitude signal commensurate with the amplitude of the oscillations in said tuned coupling circuit, and utilization means responsive to said amplitude signal and operative to provide an indication when the amplitude of said amplitude signal varies in accordance with a preselected program; and at least one responder, each responder including, a substantially nonradiative coupling circuit tuned to said interrogator frequency, impedance circuit means for changing the impedance of the tuned coupling circuit of said responder, and switching means for connecting said impedance circuit means to the tuned coupling circuit of said responder, said switching means being operative to connect and disconnect said impedance circuit means into the tuned coupling circuit of said responder in accordance with said preselected program.

21. An identification system for identifying responders when brought within inductive coupling proximity of an interrogator, said identification system comprising:

an interrogator including, a substantially nonradiative coupling circuit tuned to an interrogator frequency, signal source means connected to said tuned coupling circuit to excite said tuned circuit to oscillate at said interrogator frequency, phase detecting circuit means coupled to said signal source means and said tuned circuit to provide a phase signal commensurate with the phase difference between the oscillations in said tuned circuit and said signal source means, and utilization means responsive to said phase signal and operative to provide an indication when the amplitude of said phase signal varies in accordance with a preselected program; and at least one responder, each responder including, a substantially nonradiative coupling circuit tuned to said interrogator frequency, impedance circuit means for changing the impedance of the tuned coupling circuit of said responder, and switching means for connecting said impedance circuit means to the tuned coupling circuit of said responder, said switching means being operative to connect and disconnect said impedance circuit means into the tuned coupling circuit of said responder in accordance with said preselected program.

References Cited by the Examiner

UNITED STATES PATENTS

| | | | |
|---|---|---|---|
| 2,511,409 | 6/1950 | Mayberry | 343—100.10 |
| 2,910,579 | 10/1959 | Jones et al. | 343—6.5 |
| 3,036,295 | 5/1962 | Kleist | 343—6.5 |
| 3,054,100 | 9/1962 | Jones | 343—6.5 |
| 3,169,242 | 2/1965 | Davis et al. | 343—6.5 |
| 3,172,102 | 3/1965 | Chapman | 343—6.5 |
| 3,182,315 | 5/1965 | Sweeney | 343—6.5 |

RODNEY D. BENNETT, *Acting Primary Examiner.*

CHESTER L. JUSTUS, *Examiner.*

B. L. RIBANDO, *Assistant Examiner.*